(12) United States Patent
Bergauer et al.

(10) Patent No.: US 7,685,211 B2
(45) Date of Patent: Mar. 23, 2010

(54) DETERMINISTIC FILE CONTENT GENERATION OF SEED-BASED FILES

(75) Inventors: Ryan C. Bergauer, Redmond, WA (US); Sean C. Wohlgemuth, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 457 days.

(21) Appl. No.: 11/692,145

(22) Filed: Mar. 27, 2007

(65) Prior Publication Data

US 2008/0243960 A1    Oct. 2, 2008

(51) Int. Cl.
    *G06F 7/00* (2006.01)
(52) U.S. Cl. .................................... 707/812
(58) Field of Classification Search ............ None
    See application file for complete search history.

(56) References Cited

U.S. PATENT DOCUMENTS

| | | | |
|---|---|---|---|
| 5,978,814 | A | 11/1999 | Miller et al. |
| 6,012,063 | A | 1/2000 | Bodnar |
| 6,208,999 | B1 | 3/2001 | Spilo et al. |
| 6,324,287 | B1 * | 11/2001 | Angert ......................... 380/43 |
| 7,024,403 | B2 | 4/2006 | Kyler |
| 2005/0114338 | A1 | 5/2005 | Borthakur et al. |
| 2005/0129268 | A1 | 6/2005 | Maeno et al. |
| 2005/0182750 | A1 | 8/2005 | Krishna et al. |
| 2006/0271538 | A1 | 11/2006 | Mizrachi et al. |
| 2006/0288217 | A1 | 12/2006 | Jennings |
| 2007/0076873 | A1 * | 4/2007 | Yamamoto et al. ........... 380/241 |
| 2007/0150596 | A1 * | 6/2007 | Miller et al. ................ 709/226 |
| 2007/0250541 | A1 * | 10/2007 | Takeda ......................... 707/200 |

FOREIGN PATENT DOCUMENTS

EP    1720109 A2    11/2006

OTHER PUBLICATIONS

Kim et al., "The Design and Implementation of Tripwire: A File System Integrity Checker," Dated Feb. 23, 1995, pp. 18-29.
Pang et al., "StegFS: A Steganographic File System," Dated Mar. 5-8, 2003, pp. 1-11.
Faloutsos et al., "Signature Files an Access Method for Documents and its Analytical Performance Evaluation," Dated Oct. 1984, pp. 267-288.
Kim et al.,"A New Parallel Signature File Method for Efficient Information Retrieval," Dated 1995,pp. 66-73.

* cited by examiner

*Primary Examiner*—Charles Rones
*Assistant Examiner*—Belix M Ortiz
(74) *Attorney, Agent, or Firm*—Shook, Hardy & Bacon, LLP

(57) ABSTRACT

A method for deterministic file content generation of seed based files is comprised of extracting a seed value from a seeded file signature, passing the seed value to a seeded content generating function to produce a set of generated content, and appending the set of generated content to the seed file signature to produce a seed-based file. A delta offset may also be included in the seeded file signature, the delta offset indicating where modified content is to be substituted within the generated content.

10 Claims, 4 Drawing Sheets

DETERMINISTIC FILE CONTENT GENERATION OF SEED-BASED FILES

BACKGROUND

The testing of network servers under load often requires the server to receive and store large amounts of test data in physical storage such as a hard drive. Clients creating the large amounts of test data must also create and store large amounts of data. Due to the finite amount of physical storage, each of the client and server may eventually run out of disk space and testing may not continue.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a data structure and methods for deterministic seeded file content generation of seed-based files. A seeded file may include a seed value, a file length value indicating the length of the content to be generated, a delta offset value indicating an area within the generated content to begin inserting modified content, and a delta length indicating the length of the modified content. Content is generated by passing the seed value to a deterministic function that produces a reproducible set of generated data using the seed value. The modified data is produced by passing the corresponding value from the set of generated data to a second deterministic function to produce the modified value. The modified value replaces the corresponding value in the set of generated data.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a deterministic file content generation system, the system described is provided as an example and not a limitation. As those skilled in the art will appreciate, the present examples are suitable for application in a variety of different types of deterministic file content generation systems.

Figure 1:
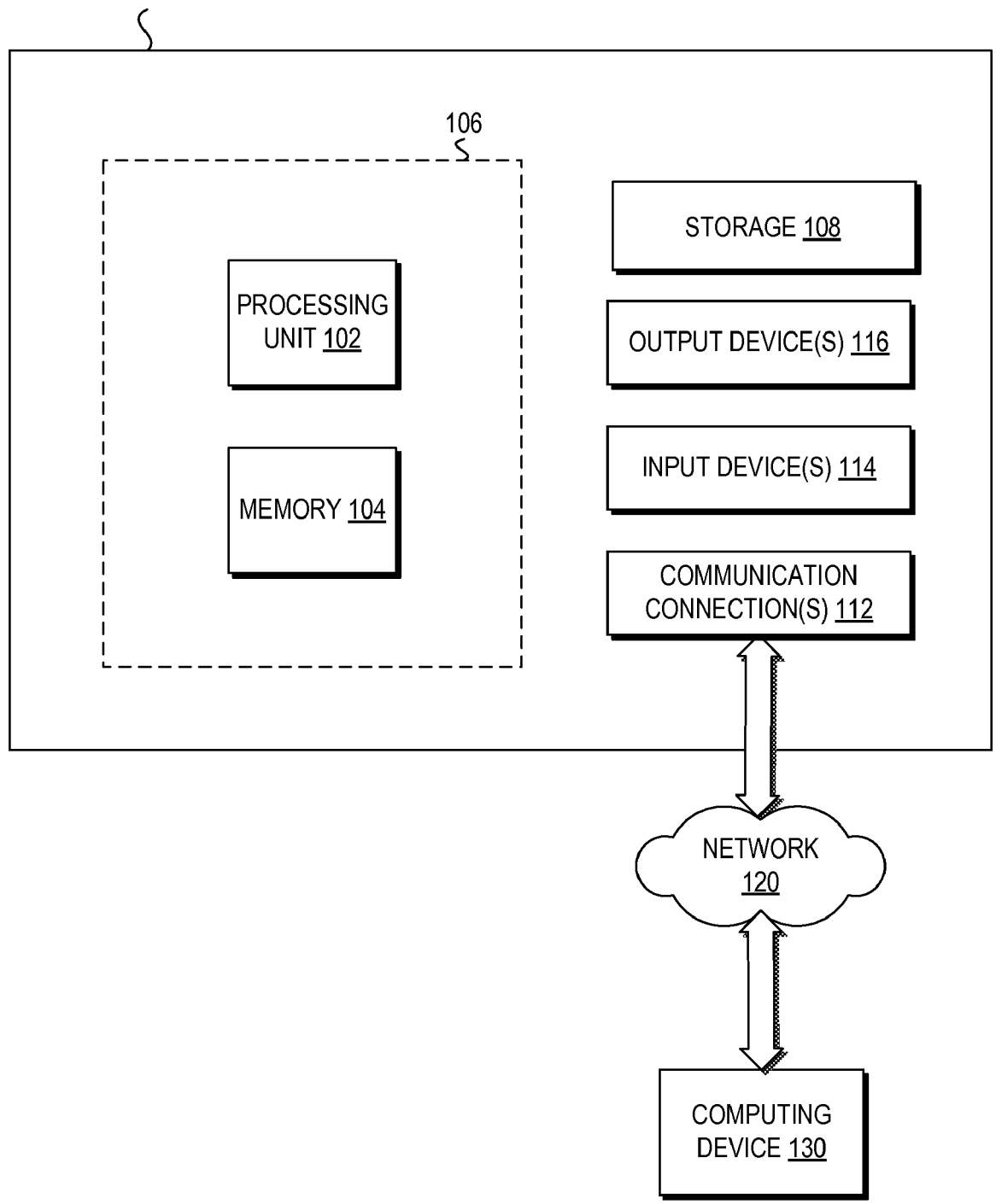
FIG. 1 shows an example of a computing device 100 for implementing one or more embodiments of deterministic file content generation.

FIG. 1 and the following discussion are intended to provide a brief, general description of a suitable computing environment to implement embodiments of the invention. The operating environment of FIG. 1 is only one example of a suitable operating environment and is not intended to suggest any limitation as to the scope of use or functionality of the operating environment. Other well known computing devices, environments, and/or configurations that may be suitable for use with embodiments described herein include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments of the invention will be described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 1 shows an example of a computing device 100 for implementing one or more embodiments of deterministic file content generation. In one configuration, computing device 100 includes at least one processing unit 102 and memory 104. Depending on the exact configuration and type of computing device, memory 104 may be volatile (such as RAM), non-volatile (such as ROM, flash memory, etc.) or some combination of the two. This configuration is illustrated in FIG. 1 by dashed line 106.

In other embodiments, device 100 may include additional features and/or functionality. For example, device 100 may also include additional storage (e.g., removable and/or non-removable) including, but not limited to, magnetic storage, optical storage, and the like. Such additional storage is illustrated in FIG. 1 by storage 108. In one embodiment, computer readable instructions to implement embodiments of the invention may be stored in storage 108. Storage 108 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 104 and storage 108 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also include communication connection(s) 112 that allow device 100 to communicate with other devices. Communication connection(s) 112 may include, but is not limited to, a modem, a Network Interface Card (NIC), or other interfaces for connecting computing device 100 to other computing devices. Communication connection(s) 112 may include a wired connection or a wireless connection. Communication connection(s) 112 may transmit and/or receive communication media.

Communication media typically embodies computer readable instructions or other data in a "modulated data signal" such as a carrier wave or other transport mechanism and includes any information delivery media. The term "computer readable media" may include communication media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

Device 100 may include input device(s) 114 such as keyboard, mouse, pen, voice input device, touch input device, infra-red cameras, video input devices, and/or any other input device. Output device(s) 116 such as one or more displays, speakers, printers, and/or any other output device may also be included in device 100. Input device(s) 114 and output device(s) 116 may be connected to device 100 via a wired connection, wireless connection, or any combination thereof. In one embodiment, an input device or an output device from another computing device may be used as input device(s) 114 or output device(s) 116 for computing device 100.

Components of computing device 100 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 100 may be interconnected by a network. For example, memory 104 may be comprised of multiple physical memory units located in different physical locations interconnected by a network.

Those skilled in the art will realize that storage devices utilized to store computer readable instructions may be distributed across a network. For example, a computing device 130 accessible via network 120 may store computer readable instructions to implement one or more embodiments of the invention. Computing device 100 may access computing device 130 and download a part or all of the computer readable instructions for execution. Alternatively, computing device 100 may download pieces of the computer readable instructions, as needed, or some instructions may be executed at computing device 100 and some at computing device 130. Those skilled in the art will also realize that all or a portion of the computer readable instructions may be carried out by a dedicated circuit, such as a Digital Signal Processor (DSP), programmable logic array, and the like.

Figure 2:
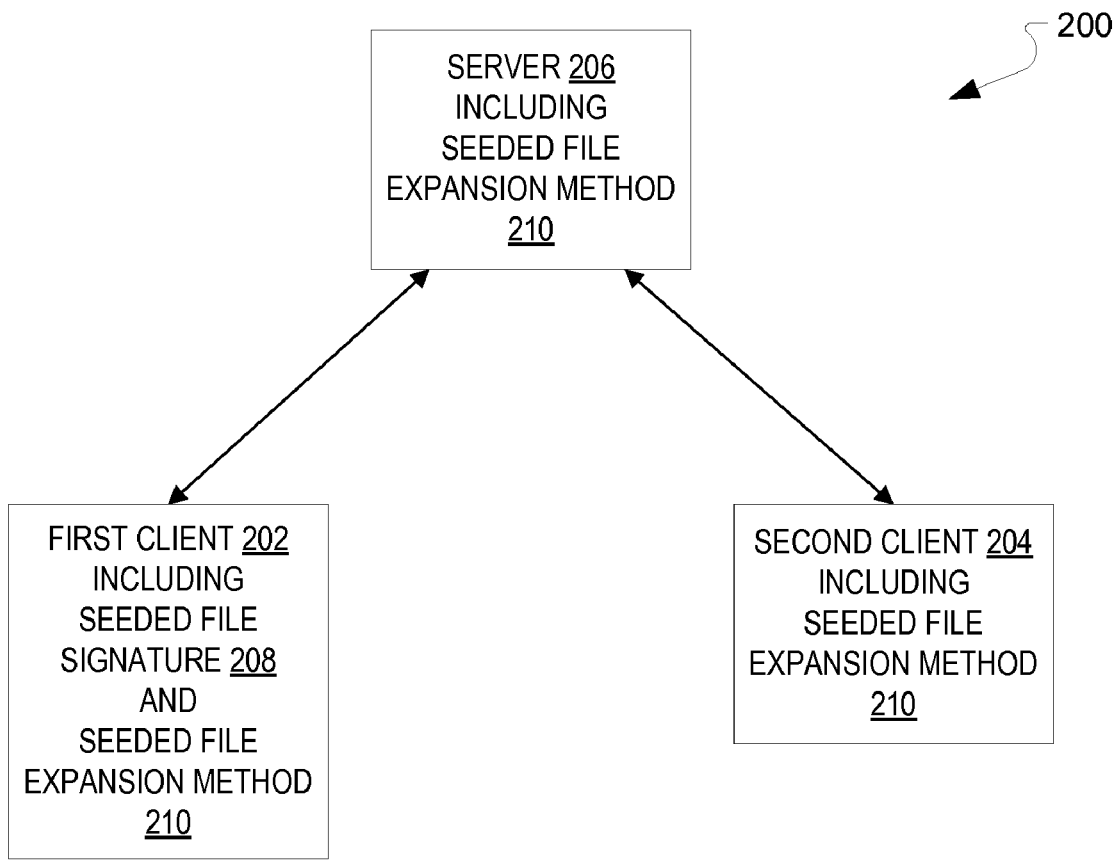
FIG. 2 shows a block diagram of an example system for testing network file replication.

Turning now to FIG. 2, FIG. 2 shows a block diagram of an example system for testing network usage load 200. A system for testing network usage load 200 typically includes a first client 202 communicatively coupled to a server 206, and second client 204 also communicatively coupled to a server 206. Note that the first client 202 and the second client 204 are also communicatively coupled by virtue of the common communicative coupling to server 206.

The process of load testing a server system, such as the server 206, typically involves creating a predetermined demand on a server system and monitoring the functioning of the server system in response to the predetermined demand. For example, a load test may involve a large number of clients connecting to a server. Each client may send a large amount of information to the server for the server to process. The ability of the server to respond to the large number of clients and process large amounts of information may be measured to determine the performance of the server when deployed.

If a load test is intended to test the response of a server to network traffic, it may not be necessary for any or all of the clients or the server to actually store the received network traffic. However, in order to verify that the data was received at the server correctly the server may store the network traffic to examine the received data. In this case, the received data must either be stored on disk, or stored in memory.

In the case where file system access is to be a part of the load test, a system for testing network usage load 200 may be used to load test a server 206. In the system for testing network usage load 200, the first client 202 may include an example seeded file signature 208 that will be described more fully in the discussion of FIG. 3. The server 206, first client 202, and second client 204 also include an example seeded file expansion method 210 that will be described more fully in the discussion of FIG. 4.

However, for the purposes of discussion, the seeded file signature 208 may be comprised of numerical data including a seed value, a file length, a delta start block, and a delta length. The seed file expansion method 210 is configured to expand the seeded file signature 208 to an expanded file. The contents of the expanded file are determined by passing the seed value to a function configured to deterministically generate random data using the seed value. The seed file expansion method 210 uses the file length included in the seed file signature 208 to determine the size of the expanded file. The contents of the expanded file are then appended to the seeded file signature to create the complete expanded file.

In this way, the first client 202 may store the smaller seeded file signature 208, then expand the seeded file signature 208 to create a network stream representing the expanded file that may be comprised of the. The first client 202 may then send the stream representing the expanded file over the network connection to the server 206. The server 206 may then strip off the appended file contents and store only the seeded file signature 208 because the server 206 may reproduce the expanded file using the seed file expansion method 210. Additionally or alternatively, the server 206 may store the streamed expanded file on disk and/or in memory. The server 206 may then send a stream representing the expanded file to the second client 204, and the second client 204 may also strip off the appended file and store only the seeded file signature 208. Additionally or alternatively, the second client 204 may store the stream representing the expanded file.

The delta start block and the delta length of the seeded file signature 208 provide a method for deterministically modifying an expanded file. The delta length may correspond to an offset in the expanded file and the delta length may correspond to the length of the section to be modified. The method for determining the content of the delta section will be discussed in more detail in the discussion of FIG. 4.

Figure 3:
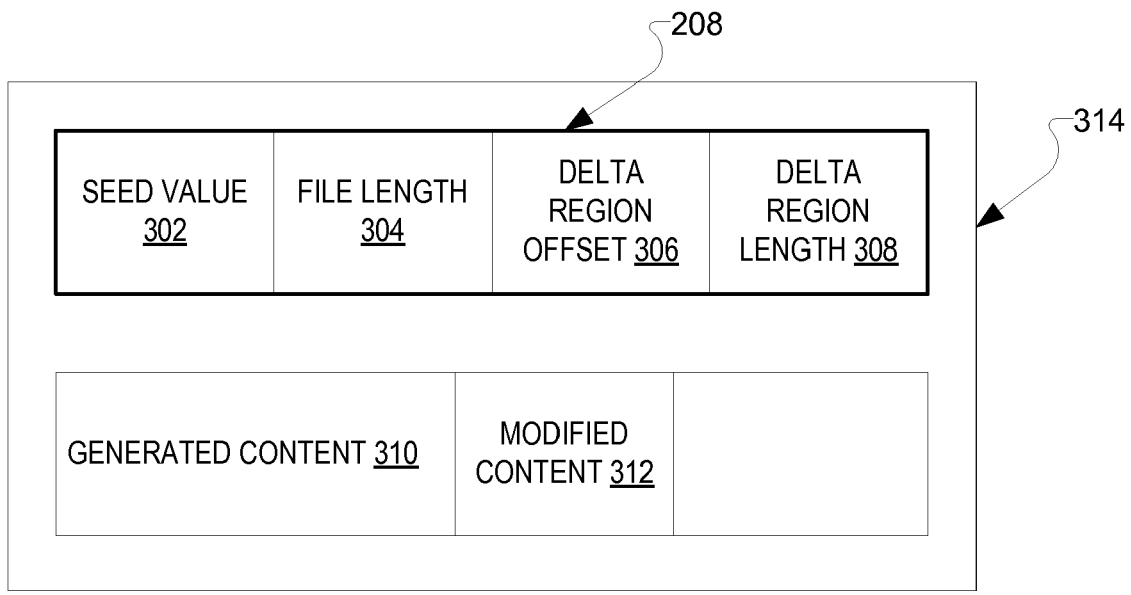
FIG. 3 shows an example of a seeded file signature.

Turning now to FIG. 3, FIG. 3 shows an example of a seeded file signature 208. The seeded file signature is illustrated as part of an expanded seeded file 314 including generated content 310 and modified content 312. The seed file signature 208 is a data structure comprised of four data fields. The first data field includes a seed value 302. The second data field includes a file length value 304. The third data field includes a delta region offset value 306. The fourth data field includes a delta region length value 308.

In an exemplary implementation, each of the four data fields, 302, 304, 306, and 308 are stored in computer readable media as a file. Each of the four data fields 302, 304, 306, and 308 are 8 bytes in size for a total of 32 bytes. Alternatively, each of the four data fields 302, 304, 306, and 308 may be of any size and may be stored in any order.

The seed value 302 may be any value and of any type. In an exemplary implementation, the seed value 302 is used to seed a pseudorandom number generating function to produce a series of random values to act as the generated content 310 for the expanded seeded file 314. To that end, the file length value 304 may also be of any value of any type. In an exemplary implementation, the file length value 304 acts to determine the number of iterations to run the pseudorandom number generating function, and thus determine the length of the generated content 310 for an expanded seeded file 314. In an alternative implementation, the file length value 304 acts to determine the size of the data set that will be generated by the pseudorandom number generating function.

The delta region offset value 306 may be of any value and of any type. In an exemplary implementation, the delta region offset value 306 in an integer representing the address or offset into the generated content 310 of an expanded seeded file 314. Such a delta region offset value 306 indicates that a separate deterministic function is to be applied to the result of subsequent iterations of the pseudorandom number generating function to produce modified content 312 within the generated content 310.

To that end, the delta region length value 306 may be of any value of any type. In an exemplary implementation, the delta region length value 306 acts to determine the number of iterations to run the separate deterministic function to determine modified content 312 for the expanded seeded file 314. Note that the delta region offset 306 may not be smaller than the data representing the beginning of the generated content 310. Accordingly, the length represented by summing the delta region offset value 306 and the delta region length value 308 may not exceed the file length 304.

Figure 4:
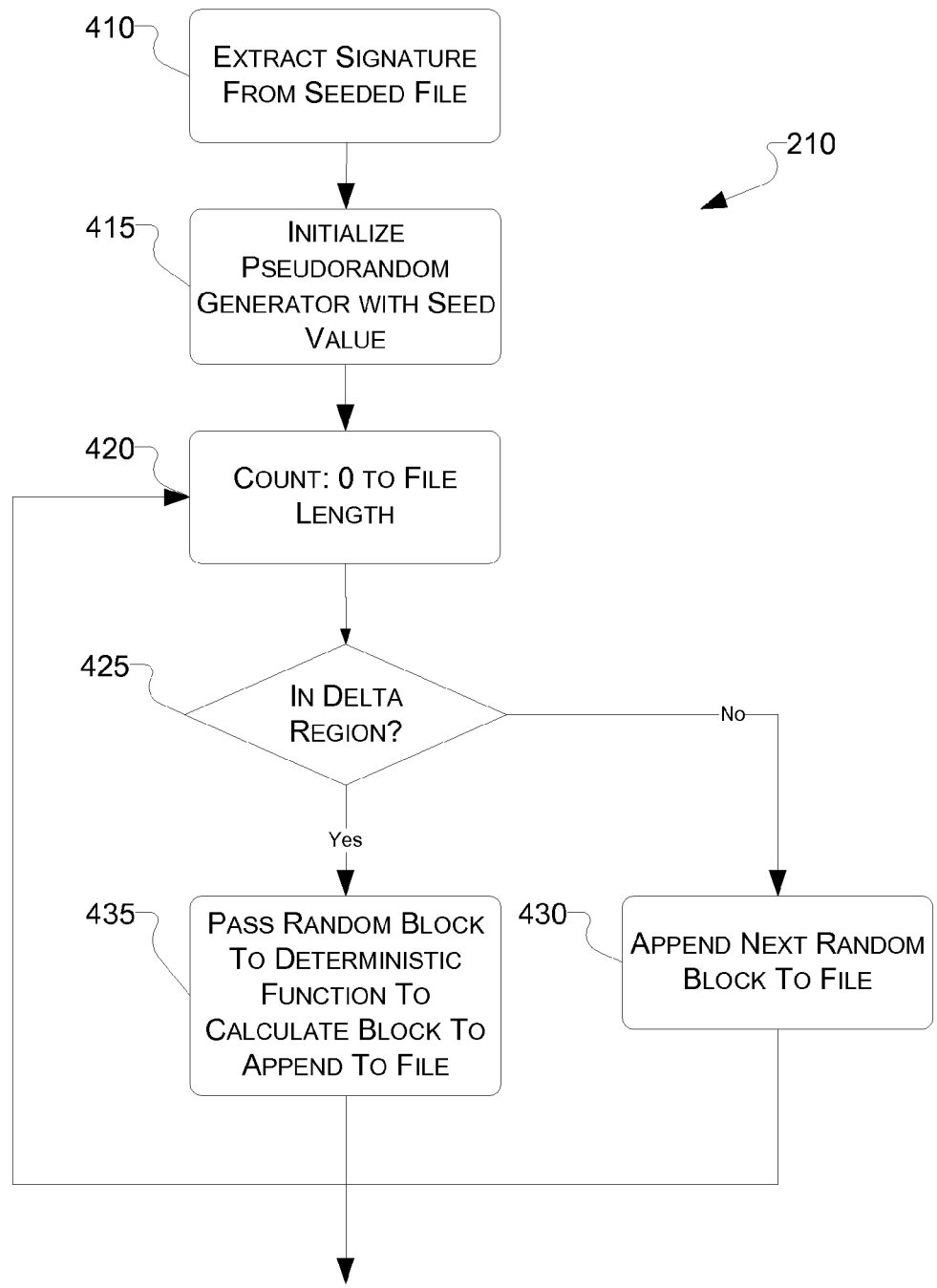
FIG. 4 shows an example seed file expansion method.

Turning now to FIG. 4, FIG. 4 shows an example seed file expansion method 210. Block 410 refers to an operation in which the signature is extracted from a seeded file. Such a signature may be implemented in accordance with the seeded file signature 208 (from FIG. 3). In an exemplary implementation, the signature includes a seed value, a file length, a delta region offset, and a delta region length.

Block 415 refers to an operation in which a pseudorandom number generator is seeded with the seed value. Such a pseudorandom number generator may be implemented such that when seeded with the seed value the pseudorandom number generator produces a reproducible set of random numbers. In an alternative implementation, any seeded content generating function that accepts a seed value and deterministically produces a set of reproducible data may be used.

Block 420 refers to an operation in which a counter is initialized at zero and iteratively runs for a number of times equivalent to the file length value.

Block 425 refers to an operation in which it is determined whether or not the current value of the counter is greater than the delta region offset value. In response to a positive determination, it has been determined that the counter is in the delta region of the generated contents and flow continues to Block 435. In response to a negative determination, it has been determined that the counter is not in the delta region of the generated contents and flow continues to Block 430.

Block 430 refers to an operation in which the current output of the pseudorandom number generator is appended to the generated content. If there are more iterations remaining in the counter, flow returns to Block 420. If there are no more iterations remaining in the counter, the generated content has been created and flow ends.

Block 435 refers to an operation in which the current output of the pseudorandom number generator is passed to a deterministic integer function to produce a modified value. An example of a deterministic integer function may be a function that accepts an integer parameter and adds another predetermined value to it. It is to be appreciated, however, that any deterministic integer function may be used. Once calculated, the modified value is appended to the generated content. If there are more iterations remaining in the counter, flow returns to Block 420. If there are no more iterations remaining in the counter, the generated content has been created and flow ends.

The invention claimed is:

1. A method, comprising:
   extracting a seed value and a file length from a seeded file signature;
   initializing a seeded content generating function using the seed value to produce a set of blocks;
   iteratively adding each block included in the set of blocks to produce generated file content;
   extracting a delta offset value and a delta length from the seeded file signature;
   determining if the position of the current iteration is equivalent to or greater than the delta offset value and is less than or equal to the sum of the delta length and the delta offset value;
   in response to a positive determination, passing the block associated with the current iteration to a separate deterministic function to produce a new block; and
   adding the block to the generated file content in place of the block associated with the current iteration.

2. The method of claim 1, wherein the seed content generating function is a pseudorandom number generating function.

3. The method of claim 1, wherein the seed content generating function is a function that produces a set of data in a reproducible fashion using the seed value.

4. The method of claim 1, further comprising receiving the seeded file signature from a first client.

5. The method of claim 1, further comprising:
   appending the generated file content to the seeded file signature to produce a stream.

6. The method of claim 5, further comprising:
   sending the stream.

7. The method of claim 1, further comprising comparing the generated file content to a set of generated file content produced by another process using the seeded file signature.

8. The method of claim 1, wherein the seed value is an integer 4 bytes long.

9. A system for deterministic file content generation of seed based files, comprising:
   a first client for producing a seeded file signature, the first client for producing a first set of seed based content based on the seeded file signature, the first client for sending the seeded file signature and the first seed based content;
   a first server for receiving the seeded file signature and the first seed based content, the first server for removing the seed based content to produce the seeded file signature, producing a second set of seed based content based on the seeded file signature, and sending the seeded file signature and the second set of seed based content to a second client; and
   the second client for receiving the seeded file signature and the second set of seed based content, the second client for storing the seeded file signature and the second set of seed based content.

10. The system of claim 9, the first client further for applying a transform to a portion of the first set of seed based content to produce a region of modified content included in the seed based content.

* * * * *